May 31, 1966     G. E. KROPA     3,253,405
COMBUSTION COOLED ROCKET NOZZLE
Filed June 10, 1963

INVENTOR.
Gomer E. Kropa
BY Paul Fitzpatrick
ATTORNEY

United States Patent Office 3,253,405
Patented May 31, 1966

3,253,405
COMBUSTION COOLED ROCKET NOZZLE
Gomer E. Kropa, North Reading, Mass., assignor to General Motors Corporation, Detroit, Mich., a corporation of Delaware
Filed June 10, 1963, Ser. No. 286,656
2 Claims. (Cl. 60—35.6)

This invention relates to rocket engine nozzles and, more particularly, it relates to a cooling system for a nozzle throat liner.

The operating temperatures of rocket nozzles frequently reach 6000° F. to 7000° F., which is considerably above the melting point of known materials used in such nozzle constructions. Therefore, some means must be provided to cool these nozzles.

In general, the preferred embodiment of this invention employs a secondary solid propellant material within the nozzle structure to burn at a slow rate and at a low temperature to provide gases to cool the nozzle liner as the hot combustion chamber exhaust gases are passing through the nozzle. The subject invention is similar in structure to known nozzles which hold a sublimating material within the structure as a coolant; however, the cooling technique is entirely different. The use of a low temperature, controlled burning rate propellant, rather than a material that sublimes provides a coolant that is independent of the heat flux. The coolant flow is provided as a result of combustion and all considerations of heat transfer (specifically, conduction and radiation) to sublime the material to provide a gaseous coolant are eliminated. The use of a propellant to provide the coolant gas permits a more positive, uniform flow and greater control than is possible with a material that sublimes. It also adds thrust to the main propulsive force because it takes no energy from the main gas stream as would a subliming material and therefore will add some energy to the main exhaust stream as it burns.

Therefore, it is the object of this invention to provide a self-contained cooling system for a rocket engine nozzle liner.

It is a further object of this invention to provide a cooling system for a rocket engine nozzle liner which employs a controlled burning rate solid propellant to undergo combustion at low temperatures under the influence of the hot combustion chamber exhaust gases passing through the exhaust nozzle to cool the exhaust nozzle liner and protect it from the effects of these hot combustion chamber exhaust gases.

Other objects, features and advantages will become apparent upon reference to the succeeding detailed description and the drawings illustrating the preferred embodiment thereof, wherein.

Figure 1:
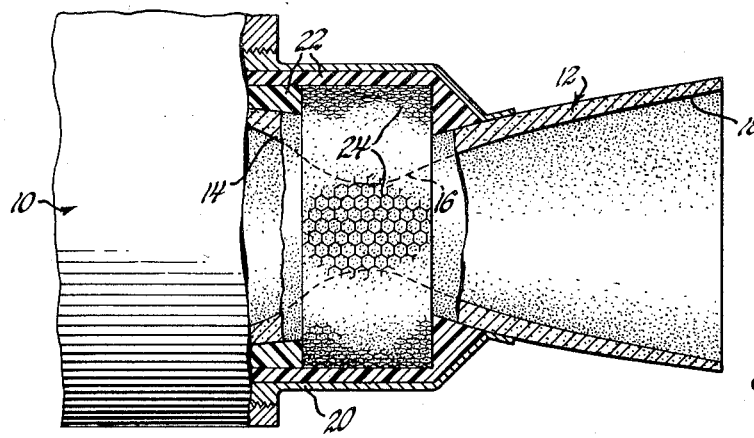
FIGURE 1 is a plan view of a rocket engine with parts thereof in section.

More particularly, FIGURE 1 shows a rocket engine 10 with an exhaust nozzle 12 located directly aft of a combustion chamber (not shown). The exhaust nozzle 12 is of the converging-diverging type, having a converging inlet 14, a venturi or throat 16, and a diverging exit cone 18. It is to be noted that the exhaust nozzle 12 may be connected to the rocket engine housing by any suitable means such as the structural member 20.

Figure 2:
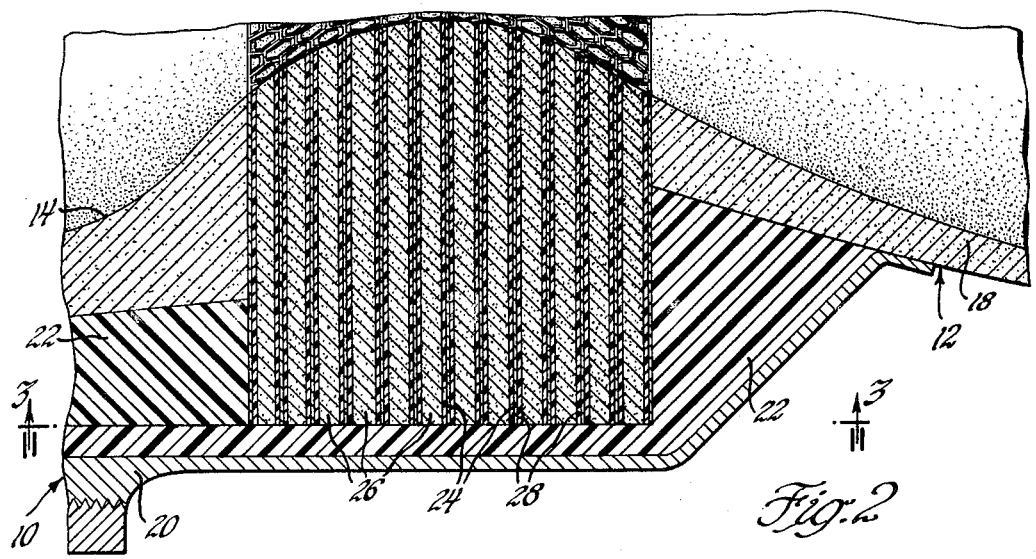
FIGURE 2 is an enlarged sectional view of the nozzle liner portion of the rocket engine of FIGURE 1.
Figure 3:
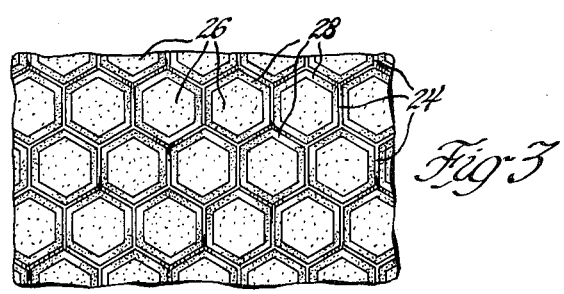
FIGURE 3 is an enlarged view of a detail of FIGURE 2 taken in the direction of arrows 3—3 in FIGURE 2.

The main subject of the invention, the nozzle liner system, is shown in detail in FIGURES 2 and 3. The converging portion 14 and the exit cone portion 18 of the nozzle liner will be constructed of any suitable heat resistant material such as tungsten. Located directly behind the nozzle liner will be the usual nozzle structural member 22, usually made of a plastic substance. The nozzle supporting structure 20 presumably will be made from steel.

Focusing our attention on the throat portion 16 of the nozzle liner, wherein the substance of the invention lies, it is noted that the nozzle liner in this area has a cellular structure. The nozzle liner for the throat portion 16 is comprised of a plurality of structural members 24 which, although shown in the preferred embodiment as taking a honeycomb pattern, may be formed in any desirable cellular pattern. For example, the structural members 24 may be formed by abutting annular disks having radial corrugations. These disks would be brazed together such that their corrugations form the desired cellular pattern. Located within the cellular pattern of the structural members 24 are a plurality of solid propellant units 26. These solid propellant units 26 will be comprised of a slow burning, solid propellant which will ignite at low temperatures to provide a flow of cooler gases out on to the throat portion 16 of the nozzle liner. These combustion gases of the solid propellant 26 will be much cooler than the hot combustion chamber exhaust gases passing through the nozzle and as a result will keep the nozzle liner cool.

Located between the supporting structure 24 and the solid propellant 26 are layers of insulator or inhibitor 28 which protect the supporting structure 24 from the heat of combustion of the solid propellant 26.

Thus, it is seen that the solid propellant 26 used as the coolant material will be ignited by the main combustion gas stream as it passes through the exhaust nozzle 12. The solid propellant 26 used as a coolant will then burn slowly in the radially outward direction and the resultant combustion gases therefrom will flow out on to the throat portion 16 of the nozzle liner. The amount of solid propellant 26 used will be governed by the desired burning time of the main rocket. The cool combustion gases burning within the structure will keep the supporting structure 24 cooled by protecting it with a film of cool gases. It is to be noted that it may be desirable to let the solid propellant 26 be a fuel rich mixture as this would decrease the burning temperature and the burning rate and increase the auto-ignition temperature. The actual solid propellant used will be chosen according to the combustion temperature and burning rate properties desired. A nonlimiting example of such a solid propellant is ammonium nitrate and rubber as disclosed in the U.S. patents to Lawrence, 3,092,963, and Wilder, 3,091,924.

Thus, it is seen that the subject invention presents an approach to a cooling system for a rocket engine nozzle liner which will enable the nozzle liner to remain intact during operation within rockets with unlimited main combustion exhaust gas temperatures.

Although but one specific embodiment of this invention has been herein shown and described, it will be understood that numerous details of the construction shown may be altered or omitted without departing from the principle of this invention as defined by the following claims.

I claim:
1. A cooled rocket engine exhaust nozzle comprising:
   an annular heat resistant cellular structure defining the contours of said nozzle said structure having internal walls defining radially extending, peripherally spaced cells open only at their radially inner ends;
   a plurality of slow burning rate, solid propellant units disposed within said cells and exposed at said inner ends to the exhaust gas flow through said exhaust nozzle, said solid propellant units being ignitable at a low temperature by said hot rocket engine exhaust gases passing through said exhaust nozzle and burning at low temperature relative to said exhaust gases to provide a stream of cool gases through said nozzle over the surface of said structure, said solid propellant units being burnable at a rate to keep said structure cool and enable it to remain intact during the time said hot exhaust gases pass through said exhaust nozzle;

and a layer of insulation material between the walls of said cellular structure and each of said solid propellant units.

2. A throat for a rocket nozzle having hot rocket engine exhaust gases flowing therethrough comprising an annular heat resistant structure having a plurality of radially extending, peripherally spaced cells open only at the radially inner ends, tubuar members of insulating material disposed in each cell and conforming to the walls thereof and slow burning solid propellant units disposed in said tubular members, said radially inward ends of said cells, said tubular members of insulating material and said solid propellant units initially forming the contour of said throat, the solid propellant units being ignitable and consumable at a temperature lower than that of said hot exhaust gases and at a rate to provide a flow of cool gases over the ends of said cells and insulating tubes to maintain the contour of said throat during the time required for said hot exhaust gases to pass through said throat.

References Cited by the Examiner

UNITED STATES PATENTS

| | | | |
|---|---|---|---|
| 3,014,353 | 12/1961 | Scully et al. | 60—35.6 |
| 3,017,746 | 1/1962 | Kiphart | 60—35.6 |
| 3,032,970 | 5/1962 | Fox | 60—35.6 |
| 3,035,950 | 5/1962 | Long. | |
| 3,091,924 | 6/1963 | Wilder | 60—35.6 |
| 3,092,963 | 6/1963 | Lawrence | 60—35.6 |
| 3,103,885 | 9/1963 | McLauchlan | 60—35.6 |
| 3,115,746 | 12/1963 | Hsia | 60—35.6 |
| 3,122,883 | 3/1964 | Turner | 60—39.66 |
| 3,137,998 | 6/1964 | Beam | 60—35.6 |

MARK NEWMAN, *Primary Examiner.*

SAMUEL LEVINE, *Examiner.*

C. R. CROYLE, *Assistant Examiner.*